United States Patent [19]

Eicher

[11] Patent Number: 5,339,572
[45] Date of Patent: Aug. 23, 1994

[54] HAND TOOL

[75] Inventor: Bernhard Eicher, Filderstadt, Fed. Rep. of Germany

[73] Assignee: Robert Bosch GmbH, Stuttgart, Fed. Rep. of Germany

[21] Appl. No.: 78,282

[22] PCT Filed: Dec. 14, 1991

[86] PCT No.: PCT/DE91/00982
§ 371 Date: Jun. 16, 1993
§ 102(e) Date: Jun. 16, 1993

[87] PCT Pub. No.: WO92/12825
PCT Pub. Date: Aug. 6, 1992

[30] Foreign Application Priority Data

Jan. 29, 1991 [DE] Fed. Rep. of Germany ....... 4102483

[51] Int. Cl.⁵ .............................................. B24B 23/02
[52] U.S. Cl. ................................................. 51/170 PT
[58] Field of Search ........... 51/170 R, 170 PT, 170 T, 51/170 MT, 170 TL; 30/514, 388, 519, 390

[56] References Cited

U.S. PATENT DOCUMENTS 3,148,568  6/1964  Hoza .
5,201,146  4/1993  Fushiya ...................... 51/170 R

FOREIGN PATENT DOCUMENTS 4021277  3/1991  Fed. Rep. of Germany .

Primary Examiner—Roscoe V. Parker
Attorney, Agent, or Firm—Michael J. Striker

[57] ABSTRACT

A hand-held machine tool, particularly an angle grinder, has a device housing (10) which is divided into a motor housing (11) and a handle (15) which is arranged at one end of the latter and is rotatable relative thereto. A positioning device (20) ensures that the rotatable handle (15) is fixed in different rotational positions at the motor housing (11). A simple construction of the positioning device (20) is achieved in that a central bearing neck (22) is formed on at the motor housing (11), one of the housing shells (151) of the handle (15) which is constructed from two shells being supported in an annular groove (23) provided at the bearing neck (22). The positioning device (20) has a tension band (27) which is inserted in the annular groove (23) and is fastened by its ends to the housing shell (151) and clamps around the bearing neck (22) along a portion of its circumference at the side located diametrically opposite the support point, and a clamping element (29) for applying a tensile force to the tension band (27). The other housing shell (152) is screwed to the first housing shell (151) (FIG. 2).

10 Claims, 2 Drawing Sheets

HAND TOOL

PRIOR ART

The invention concerns a hand-held machine tool, particularly a hand-operated angle grinder, of the generic type.

All modern hand-held machine tools, particularly hand-operated angle grinders, are outfitted with an on/off switch for the electric drive which is actuated via the switch strip. The switch strip is situated at the underside of the handle and is actuated by at least one finger when grasping the handle and held in an actuated position while working with the machine. The ergonomic design of the handle, e.g. the cross-sectional shape and angle of inclination relative to the device axis, is optimized for one working position of the machine.

Some hand-held machine tools are used in more than one work position for various working operations. Apart from grinding or scouring, for example, an angle grinder is also used e.g. for parting or cutting stone slabs or plates. The optimal work position mentioned above is normally provided for the scouring work position in which the grinding disk faces downward, i.e. roughly parallel to the switch strip. However, for cutting work the angle grinder is rotated by 90° toward the left or right around its longitudinal axis so that the cutting wheel is roughly vertical to the workpiece. Due to this rotation, the handle and switch strip assume an unfavorable position for the hand of the person grasping it. If the machine is rotated to the left and the handle is grasped with the right hand, the switch strip lies in the ball of the thumb. If the machine is rotated to the right and held in the right hand, the switch strip is only actuated and held by the thumb. In either case, it is impossible to hold the switch strip in a secure and comfortable manner. Moreover, in danger situations the user cannot react quickly enough to switch off the machine in view of the position of the safety catch and switch lock.

To avoid this disadvantage there is already a hand-held machine tool of the type mentioned above in which the handle part of the housing or the gear head part of the housing is held at the motor housing so as to be rotatable and can be fixed in defined rotational positions by a positioning device to achieve a working position which is more favorable ergonomically.

In a hand-held machine tool of this type which has already been suggested (P 40 22 668.9) the rotation of the handle and gear head is enabled in that the shell-like housing of the rotatable housing part is provided with a radially projecting collar which engages in a circumferential groove at the motor housing. The manually actuated positioning device includes a locking arrangement for locking the rotatable housing part at the motor housing and a clamping device for clamping the rotatable housing part at the motor housing. The locking arrangement has at least two locking grooves which are arranged in the motor housing so as to be offset relative to one another by a rotational angle and a locking cam which can be swiveled in the shell housing of the rotatable housing part and is capable of positively engaging in one of the locking grooves. The clamping device has a clamping screw which extends transversely to a longitudinal slot in the projecting collar of the shell housing. The clamping screw can be screwed into a thread by a clamping lever and can cause the housing areas of the shell housing constructed at both sides of the longitudinal slot to move together while reducing the width of the longitudinal slot. It is necessary to provide the clamping device in addition to the locking arrangement so as to ensure a slight rotational movement of the rotatable housing part at the motor housing on the one hand and so that a rigid connection of the motor housing and rotatable housing parts is always provided when working with the hand-held machine tool in different relative positions of these housing parts.

ADVANTAGES OF THE INVENTION

The hand-held machine tool according to the invention has the advantage of a very simple construction of the rotational guidance and positioning device of the rotatable housing part in different work positions. Positioning is effected with frictional engagement by tightening the tension band which also simultaneously takes over the function of rotational guidance of the housing. An additional advantage of the hand-held machine tool according to the invention consists in that the rotatable housing part can not only be fixed in a set predetermined working position, but it is also possible to alter the position individually by several angular degrees so as to afford the individual user ergonomically optimized handling of the hand-held machine tool depending on his individual requirements. The motor housing and rotatable housing part can be fixed in every relative position so as to be secured against rotation in the predetermined rotational angle range.

According to a first embodiment form of the invention, one housing shell can be supported in the annular groove in the bearing neck via a ring segment which is inserted in the annular groove and integral with the housing shell, the clamping element being formed by a clamping lever which acts on one end of the tension band and can be screwed with a coarse thread in a threaded bore hole in the housing shell.

According to another embodiment form of the invention, the housing shell can be supported in the annular groove by a curved contact pressure member at the end of a clamping screw, the contact pressure member being inserted in the annular groove and acted upon by the clamping screw in the radial direction. The clamping screw can be screwed in the radial direction into a threaded bore hole in one housing shell.

DRAWING

The invention is explained in more detail in the following description with reference to embodiment examples shown in the drawing.

DESCRIPTION OF THE PREFERRED EMBODIMENT

Figure 1:
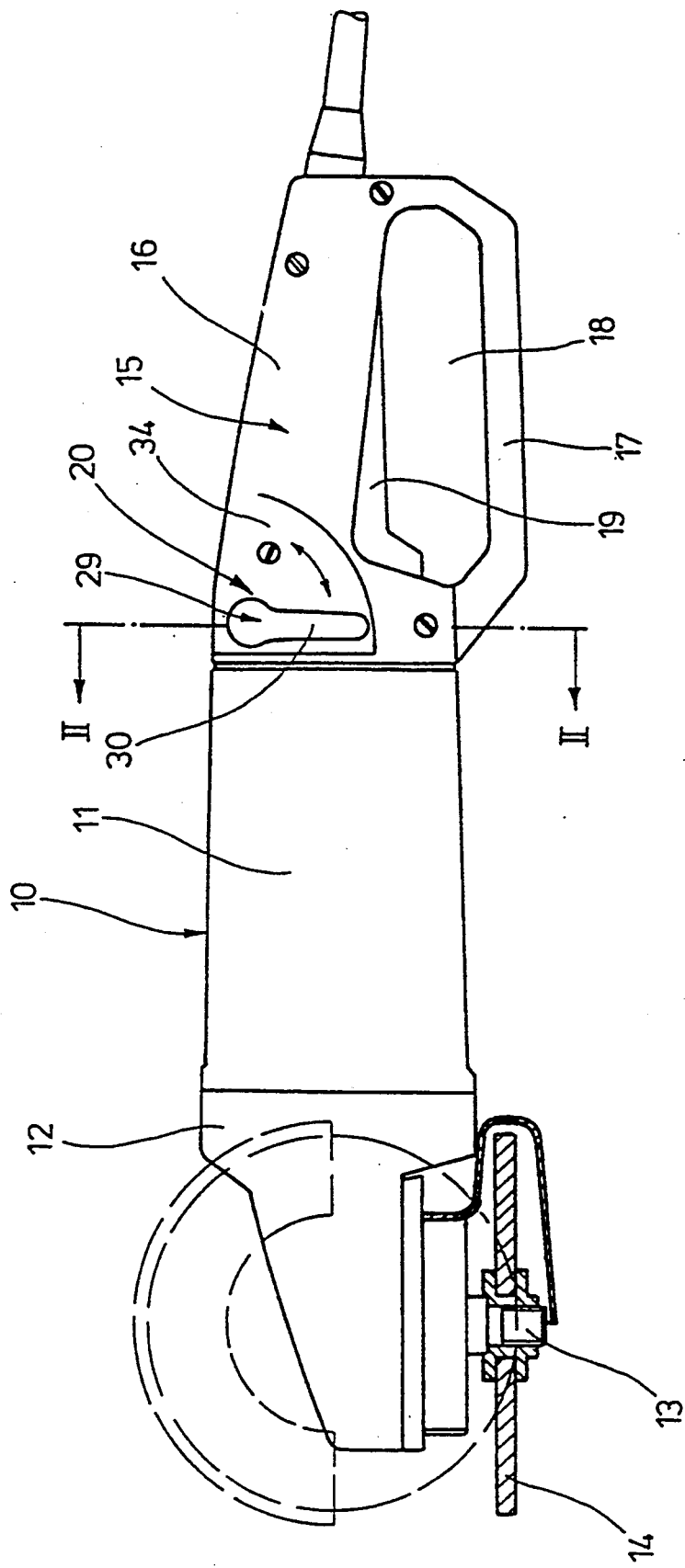
FIG. 1 shows a side view of a hand-operated angle grinder.

The hand-operated electric angle grinder shown in a side view in FIG. 1 as an embodiment example for a common electric hand-held machine tool has a device housing 10 which is divided into a motor housing 11, a gear head 12 which is arranged at one end of the housing of the motor housing 11 and has a projecting drive spindle 13 for a grinding disk 14, and a handle 15 which is arranged at the other end of the motor housing 11 and is constructed so as to be rotatable at the motor housing 11 around its longitudinal axis over a predetermined rotational area. The handle 15 includes a handle stock 16 which is held in the hand when working with the angle grinder and a stirrup 17 which is integral with the latter and extends along the underside of the handle stock 16 so as to leave a grip-through opening 18 and protect the finger from below when the handle stock 16 is grasped. At the underside of the handle stock 16 facing the stirrup 17, a switch strip 19 projects into the grip-through opening 18 and actuates an on/off switch for an electric drive motor which is accommodated in the motor housing 11. The gear head 12 is securely connected with the motor housing 11, while the handle 15 which is rotatable at the motor housing 11 can be fixed in three different rotational positions by a positioning device 20 at the motor housing 11. In the relative position of the motor housing 11 and handle 15 shown in FIG. 1 the angle grinder is used for so-called scouring. In this relative position, the grinding disk 14 is located roughly parallel to the switch strip 19. By rotating the handle 15 or the motor housing 11 by 90° to the left or right, the angle grinder can be moved out of this scouring position and provided for "cutting or parting" operation. In this work position of the angle grinder the handle 15 is maintained in the position shown in FIG. 1 and the motor housing 11, including the gear head 12, is rotated by 90° so that the grinding disk 14 occupies the position shown in dash-dot lines in FIG. 1, in which it is aligned approximately at a right angle to the switch strip 19.

Figure 2:
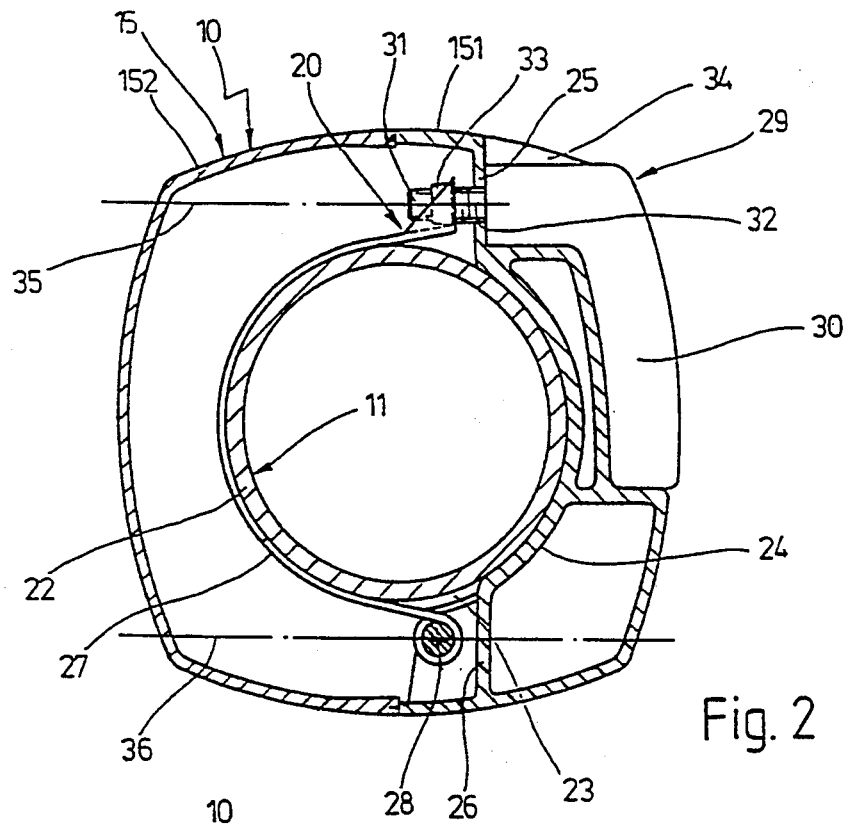
FIG. 2 shows a section along the line II—II in FIG. 1.

The positioning device 20 and the rotatable mounting of the handle 15 at the motor housing are shown in detail in FIG. 2. A hollow cylindrical central bearing neck 22 is formed onto the motor housing 11 and covered by the two housing shells 151, 152 of the handle 15. An annular groove 23 is incorporated in the outer wall of the bearing neck 22, one housing shell 151 being supported in this annular groove 23 by a ring segment 24 extending over a circumferential angle of the annular groove 23 of more than 90° and connected via cross-pieces 25, 26 so as to be integral with the housing shell 151. A tension band 27 which is fastened at two points to the housing shell 151 lies in the region of the annular groove 23 located opposite the ring segment 24. The tension band 27 which forms part of the positioning device 20 is formed by a smooth-surface steel band which is rotatably fastened by one end at a suspension pin 28 fixed at the housing and is gripped at its other end by a clamping element 29 fixed at the housing. The clamping element 29 includes a clamping lever 30 with a threaded stem 31 which can be screwed into a threaded bore hole 32 in the cross-piece 25 with a coarse thread, the threaded bore hole 32 being fixed with respect to the housing. A nut 33 supporting the end of the tension band 27 is screwed onto the threaded stem 31. The nut 33 serves simultaneously for adjusting the tensile force applied to the tension band 27 when swiveling the clamping lever 30. The clamping lever 30 which can be swiveled by approximately 90° lies flush in a recess 34 formed into the outside of the housing shell 151 so that it does not project out over the housing contour in a troublesome manner when operating the hand tool. The second housing shell 152 is fastened at the first housing shell 151 by screws, two of which are indicated in FIG. 2 by dash-dot lines 35, 36.

The clamping lever 30 must be swiveled up in the direction of the arrow in FIG. 1 to disengage the positioning device 20. Its threaded stem 31 is accordingly screwed toward the left according to FIG. 2 and the clamping force is removed from the tension band 27. This allows the handle 15 to rotate on the bearing neck 22 and the latter can be rotated by ±90° so as to be defined by the end stop which is not shown in the drawing. The clamping lever 30 is then swiveled down again in the direction of the arrow in FIG. 1 so that the threaded stem 31 of the clamping lever 30 is screwed to the right again according to FIG. 2 and exerts a tensile force on the tension band 27. The handle 15 is accordingly clamped against rotation by the tension band 27 at the bearing neck 22 of the motor housing 11. It is not necessary to rotate the handle 15 until the end stops are reached. A different relative position of the handle 15 and motor housing 11 can be adjusted when ergonomically advantageous.

Figure 3:
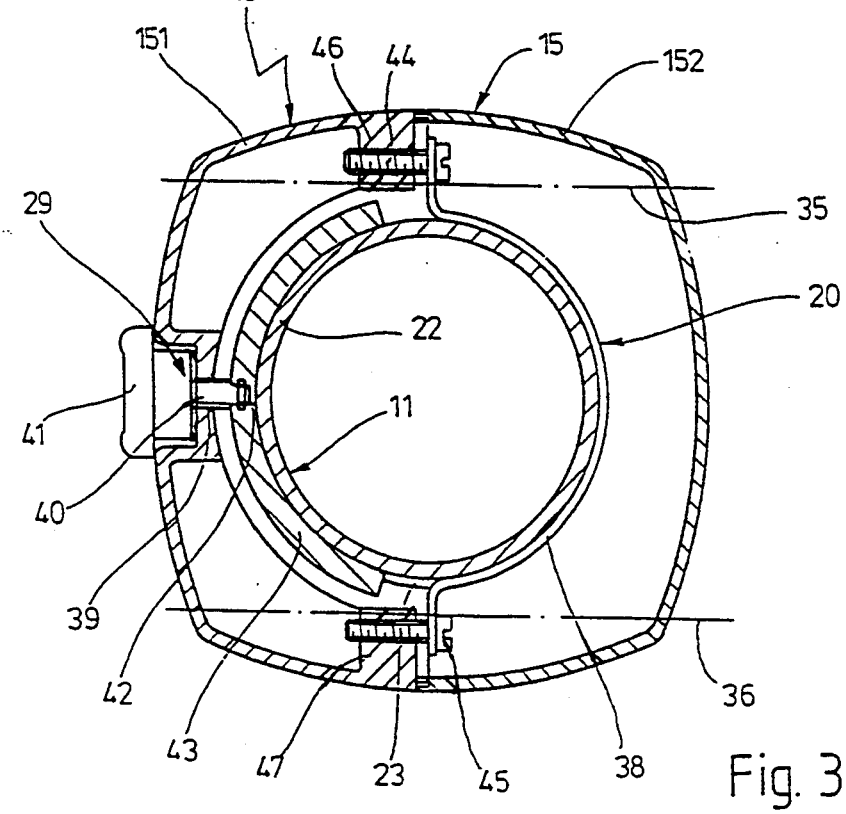
FIG. 3 shows a view of an angle grinder identical to that in FIG. 2 according to another embodiment example.

In the embodiment form of an angle grinder shown in cross section in FIG. 3, the positioning device 20 again includes a tension band 38, which is located in the annular groove 23 in the bearing neck 22 and fastened at both ends in the housing shell 151, as well as the clamping element 29 which exerts a tensile force on the tension band 38. The clamping element 29 is formed in this instance by a clamping screw 40 which is screwed in the radial direction into a threaded bore hole 39 in the housing shell 151 and is connected with a hand screw 41 projecting out at the housing shell 151. The end of the clamping screw 40 engages in a pocket bore hole 42 of a contact pressure member 43 shaped like a ring segment and is supported at the base of the pocket bore hole 42. The ring segment-shaped contact pressure member 43 lies in the annular groove 23 opposite the tension band 27 and extends over a circumferential angle of the annular groove 23 of more than 90°. The contact pressure member 43 is manufactured from plastic and is formed on at the end of the clamping screw in the injection molding process. By rotating the hand screw 41 in one direction, the clamping screw 40 is screwed radially, as seen in FIG. 3, into the interior of the housing shell 151 and presses the contact pressure member 43 against the bearing neck 22 so that tension is applied to the tension band 38. Each end of the tension band 38 is fastened by a screw 44 and 45, respectively, to a housing peg 46 and 47, respectively, which is integral with the housing shell 151. The second housing shell 152 is in turn screwed tightly to the first housing shell 151 by screws. Two screws are symbolized by dash-dot lines 35, 36. The tensile force can be removed from the tension band 38 by loosening the clamping screw 40 so that the handle 15 can be rotated on the bearing neck 22 in the same manner as described in FIG. 2. The clamping screw 40 is tightened again in the adjusted relative position of the handle 15 and the motor housing 11, and the handle 15 is accordingly clamped against rotation via the bearing neck 22 at the motor housing 11.

The tension bands 27 and 38 can be constructed as link bands rather than steel bands. This has the advantage that the tension band has better contact at the bearing neck, releases the clamping force in an improved manner in the relaxed state, and accordingly allows a more uniform rotational movement of the handle 15.

I claim:

1. Hand-held machine tool, particularly hand-operated angle grinder, with a device housing which is divided into a motor housing receiving an electric drive, a gear head arranged at one end of the motor housing and having a projecting drive spindle for a tool, and a handle arranged at the other end of the motor housing and having a switch strip for switching the electric drive on and off, in which either the handle or the gear head is constructed from two shells as a rotatable housing part which is rotatable around its longitudinal axis relative to the motor housing, and with a manually actuated positioning device for fixing the rotatable housing part in different rotational positions relative to the motor housing, characterized in that a central bearing neck (22) is formed on the motor housing (11), in that one of the housing shells (151) of the rotatable housing part (15) formed by two shells is supported in an annular groove (23) in the bearing neck (22), in that the positioning device (20) has a tension band (27; 38) which lies in the annular groove (23), its ends being fastened to the housing shell (151) supported at the bearing neck (22), and clamps around the bearing neck (22) along a part of its circumference at the side located diametrically opposite the supporting point, and a clamping element (29) for applying tensile force to the tension band (27; 38), and in that the other housing shell (152) is fastened to the first housing shell (151), preferably by screws.

2. Device according to claim 1, characterized in that one housing shell (151) has a ring segment (24) for support at the bearing neck (22), which ring segment (24) is inserted in an annular groove (23) and preferably extends along a circumferential angle of the bearing neck (22) of more than 90°, and in that the clamping element (29) is formed by a clamping lever (30) which acts on one end of the tension band (27) and is provided with a threaded stem (31) which can be screwed via a coarse thread into a threaded bore hole (31) in the housing shell (151).

3. Device according to claim 2, characterized in that the housing shell (151) has a recess (34) which is formed into the outside and in which the clamping lever (30) is inserted so as to be flush with the outer contour of the housing shell (151).

4. Device according to claim 1, characterized in that the clamping element (29) includes a clamping screw (40) which screws into a threaded bore hole (39) in one housing shell (151) in the radial direction and a contact pressure member (43) in the shape of a ring segment forming the support point of one housing shell (151) at the bearing neck (22), which contact pressure member (43) is inserted in the annular groove (23) of the bearing neck (22) and is acted upon in the radial direction by the force of the clamping screw (40).

5. Device according to claim 4, characterized in that the contact pressure member (43) extends along a circumferential angle of the bearing neck (22) of more than 90°, and in that the clamping screw (40) acts approximately centrally on the contact pressure member (43).

6. Device according to claim 5, characterized in that the contact pressure member (43) has a pocket bore hole (42), the end of the clamping screw projects into the latter and is supported at the pocket bore hole.

7. Device according to claim 6, characterized in that the contact pressure member (43) is manufactured from plastic and is injection molded onto the end of the clamping screw (40).

8. Device according to claim 1, characterized in that the tension band (27, 38) is constructed as a smooth-surface steel band.

9. Device according to claim 1, characterized in that the tension band (27, 38) is constructed as a link band.

10. Device according to claim 1, characterized in that the rotatable housing part formed from two shells is the handle (15).

* * * * *